(12) United States Patent  
Rossi

(10) Patent No.: US 7,742,091 B2  
(45) Date of Patent: *Jun. 22, 2010

(54) FLEXY-POWER AMPLIFIER: A NEW AMPLIFIER WITH BUILT-IN POWER MANAGEMENT

(75) Inventor: Giuseppe Rossi, Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 1297 days.

This patent is subject to a terminal disclaimer.

(21) Appl. No.: 11/240,355

(22) Filed: Oct. 3, 2005

(65) Prior Publication Data

US 2006/0023095 A1     Feb. 2, 2006

Related U.S. Application Data

(63) Continuation of application No. 10/003,662, filed on Oct. 18, 2001, now Pat. No. 6,982,758.

(60) Provisional application No. 60/307,513, filed on Jul. 23, 2001.

(51) Int. Cl.  
*H04N 3/15* (2006.01)  
*H04N 5/335* (2006.01)

(52) U.S. Cl. ..................... 348/300; 348/308

(58) Field of Classification Search ............... 348/294, 348/300, 308, 372, 302, 229.1, 255; 330/353, 330/359, 260, 86  
See application file for complete search history.

(56) References Cited

U.S. PATENT DOCUMENTS

| | | | |
|---|---|---|---|
| 5,105,277 A * | 4/1992 | Hayes et al. ............... 348/313 |
| 5,321,315 A | 6/1994 | Kannegundla |
| 5,381,177 A | 1/1995 | Naguchi et al. |
| 5,406,222 A | 4/1995 | Brokaw |
| 5,485,206 A | 1/1996 | Nakagawa et al. |
| 5,665,959 A * | 9/1997 | Fossum et al. .............. 348/298 |
| 5,892,540 A | 4/1999 | Kozlowski et al. |
| 6,185,274 B1 | 2/2001 | Kinno et al. |
| 6,366,320 B1 * | 4/2002 | Nair et al. ................... 348/308 |
| 2005/0062865 A1 | 3/2005 | Shibazaki |

* cited by examiner

*Primary Examiner*—Jason Whipkey  
(74) *Attorney, Agent, or Firm*—Dickstein Shapiro LLP

(57) ABSTRACT

A voltage amplifier is provided. The voltage amplifier includes an amplifier stage to amplify an input signal. A bias current generator supplies a bias current to the amplifier stage. The bias current generator is controllable in response to a frame rate signal that is representative of a video frame rate. A compensation network stabilizes a loop response of the voltage amplifier. The compensation network is controllable in response to the frame rate signal.

20 Claims, 4 Drawing Sheets

FLEXY-POWER AMPLIFIER: A NEW AMPLIFIER WITH BUILT-IN POWER MANAGEMENT

CROSS-REFERENCE TO RELATED APPLICATIONS

This application is a continuation of application Ser. No. 10/003,662, filed Oct. 18, 2001, now U.S. Pat. No. 6,982,758 which claims the benefit of U.S. Provisional Application entitled "FLEXY-POWER AMPLIFIER: A NEW AMPLIFIER WITH BUILT-IN POWER MANAGEMENT", filed Jul. 23, 2001, Application Ser. No. 60/307,513, which are hereby incorporated by reference in their entireties.

TECHNICAL FIELD

This invention relates to complementary metal oxide semiconductor active pixel sensors (CMOS APS), and more particularly to power amplifiers used in CMOS APS systems.

BACKGROUND

Conventional active pixel digital video camera devices for video cell phone application are typically designed for operation at a frame rate of 30 fps (frames per second). However, due to the limited bandwidth of the existing phone network, they may operate at a slower frame rate of about 15 fps. Since the power consumption and settling time of conventional digital video camera devices was originally optimized for performance at 30 fps, operating the devices at a slower frame rate may result in excessive power consumption and increased susceptibility to noise.

SUMMARY

A voltage amplifier is provided. The voltage amplifier includes an amplifier stage to amplify an input signal. A bias current generator supplies a bias current to the amplifier stage. The bias current generator is controllable in response to a frame rate signal that is representative of a video frame rate. A compensation network stabilizes a loop response of the voltage amplifier. The compensation network is controllable in response to the frame rate signal.

DESCRIPTION OF DRAWINGS

Like reference symbols in the various drawings indicate like elements.

DETAILED DESCRIPTION

Figure 1:
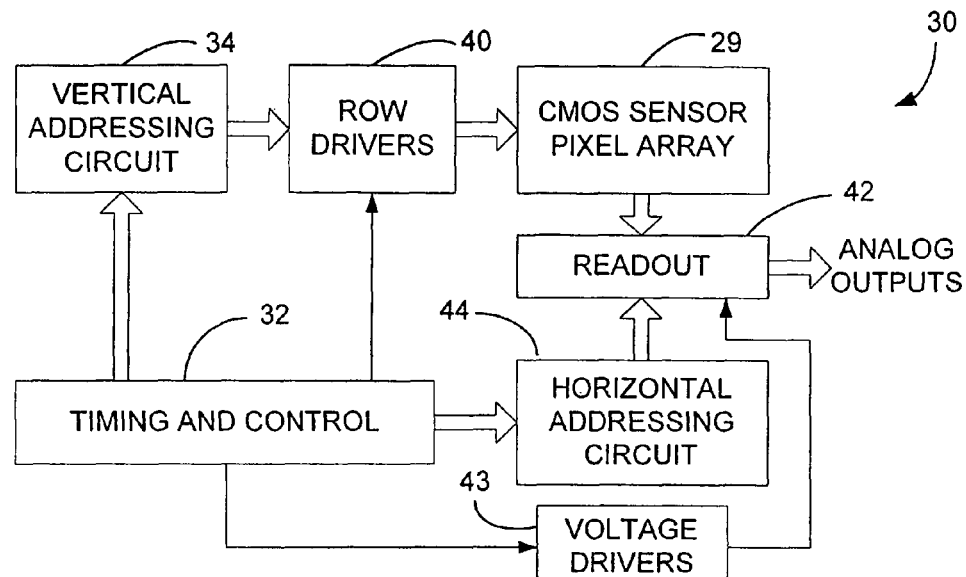
FIG. 1 is a block diagram of an exemplary CMOS active pixel sensor imager.

FIG. 1 shows a CMOS active pixel sensor (APS) imager 30 that includes an array of active pixel sensors 29 and a controller 32 that provides timing and control signals to enable reading out of signals stored in the pixels. Exemplary arrays have dimensions of 128 by 128 pixels or 256 by 256 pixels. The actual size of the array 29 will depend on the particular implementation. The imager is read out a row at a time using a column parallel readout architecture. The controller 32 selects a particular row of pixels in the array 29 by controlling the operation of a vertical addressing circuit 34 and row drivers 40. Charge signals stored in the selected row of pixels are provided to a readout circuit 42. The pixels read from each of the columns then can be read out sequentially using a horizontal addressing circuit 44. A set of voltage drivers 43 generates low noise reference voltages for the readout circuit 42. Differential pixel signals (VOUT1, VOUT2) are provided at the output of the readout circuit 42.

Figure 2:
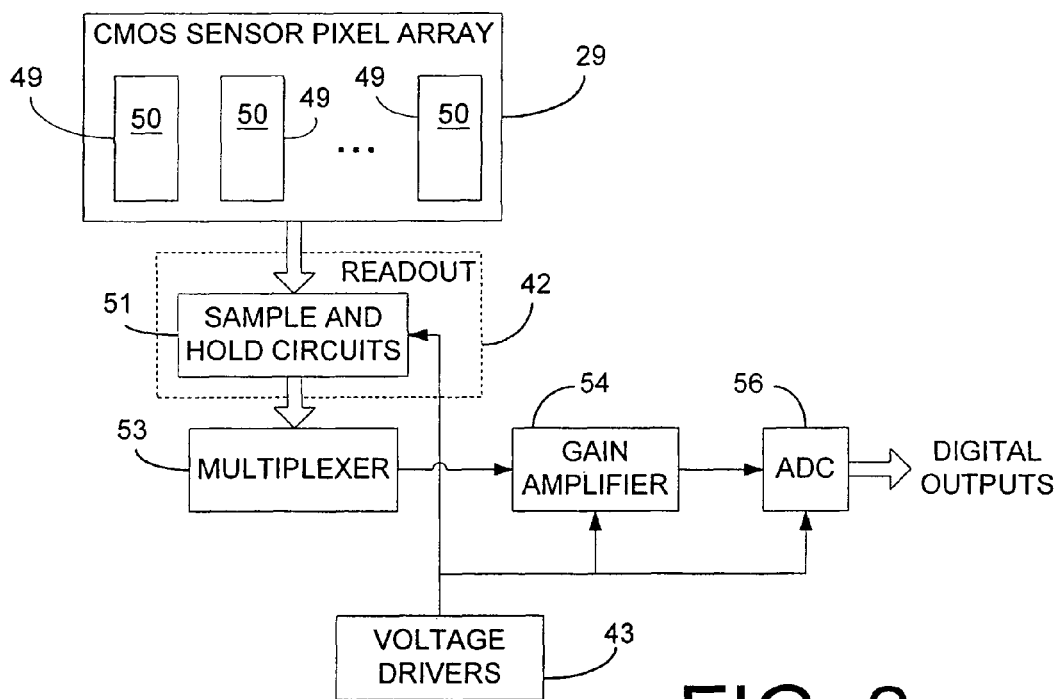
FIG. 2 is a block diagram of an array of active pixel sensors and a readout circuit.

As shown in FIG. 2, the array 29 includes multiple columns 49 of CMOS active pixel sensors 50. Each column includes multiple rows of sensors 50. Signals from the active pixel sensors 50 in a particular column can be read out to a readout circuit 42 associated with that column. The readout circuits 42 include sample and hold circuits 51 to sample the sensor signals. A multiplexer 53 multiplexes the signals stored in the readout circuits 42 so that the signals can be read to a gain amplifier 54 that is common to the entire pixel array 29. The analog output signals can then be sent, for example, to an analog-to-digital converter (ADC) 56. The set of voltage drivers 43 provides reference voltages to the imager 30 including the sample and hold circuits 51, the gain amplifier 54, and the ADC 56.

Figure 3:
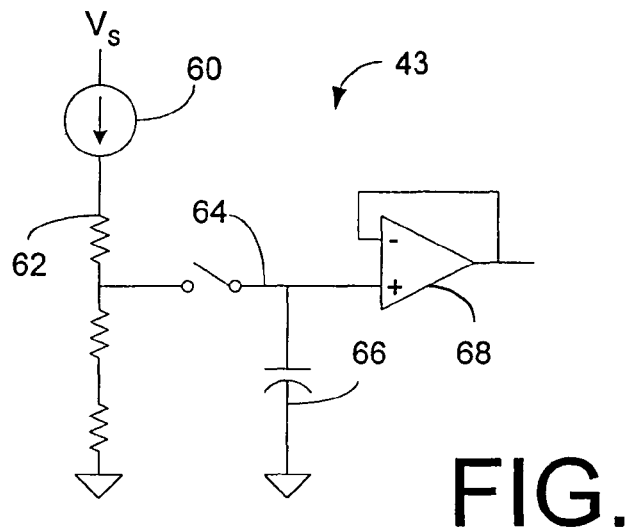
FIG. 3 is a block diagram of a voltage driver.

FIG. 3 shows an embodiment of one of the voltage drivers 43. The voltage driver 43 includes a current source 60 coupled to a resistor string 62 to generate a reference voltage. A switch 64 applies the reference voltage to a holding capacitor 66 at a predetermined interval to minimize voltage error caused by switching noise generated by the imager 30. A voltage amplifier 68 is connected in a voltage follower configuration to provide a impedance output voltage.

Figure 4:
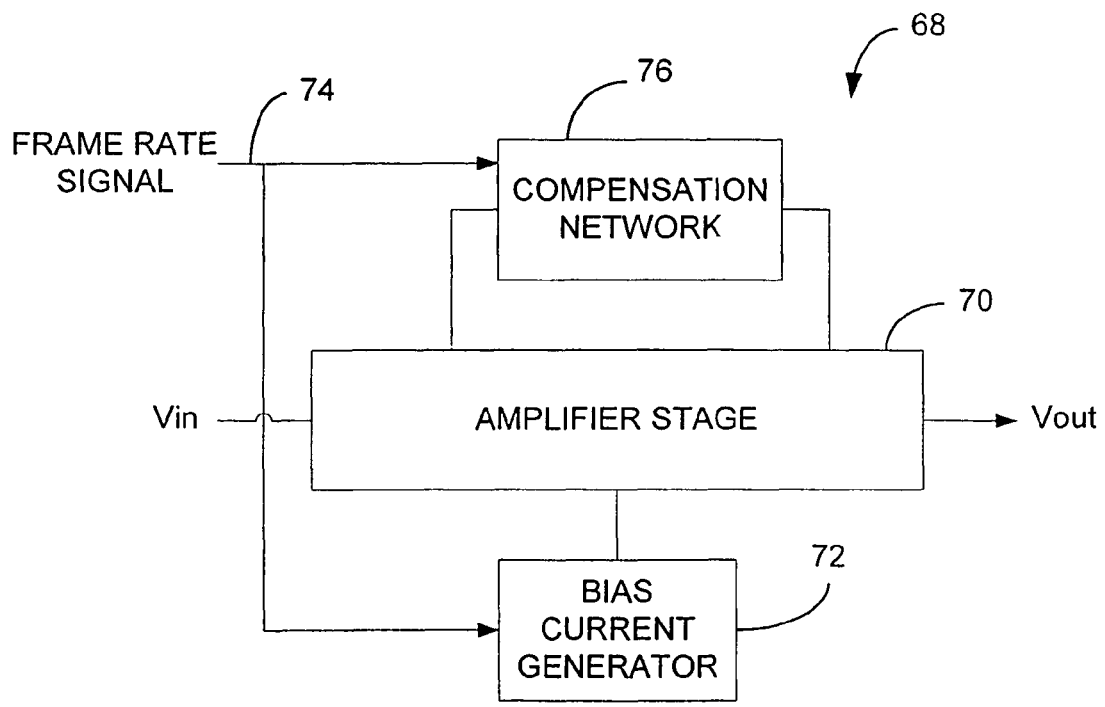
FIG. 4 is a block diagram of a voltage amplifier.

FIG. 4 shows a block diagram of an embodiment of a voltage amplifier 68. The voltage amplifier 68 includes an amplifier stage 70 to generate an output voltage Vout from an input voltage Vin. The amplifier stage 70 is operated in class A mode. A bias current generator 72 supplies a bias current to the amplifier stage 70 for biasing the amplifying devices (not shown). A frame rate signal 74 controls the magnitude of the bias current generated by the bias current generator 72 so that at lower frame rates the bias current supplied to the amplifier stage 70 is reduced. Since the amplifier stage 70 is operated in class A mode, the reduction in bias current is approximately proportional to a reduction in the power consumption of the voltage amplifier 43. Although the frame rate signal 74 preferably indicates two different frame rates, the signal 74 may indicate multiple frame rate levels such as four or eight different frame rates.

A compensation network 76 is coupled to the amplifier stage 70 to control the gain-bandwidth of the voltage amplifier 68 so that loop stability is maintained. The frame rate signal 74 may control the compensation network 76 in conjunction with the bias current generator 72 to maintain effective stability margins for the voltage amplifier 68. The stability margins preferably include a loop phase margin of about 60 degrees to provide a critically damped response to load transients and input voltage transients. The voltage amplifier 68 will operate at phase margins both significantly greater and less than 60 degrees. As the phase margin approaches zero degrees, the voltage amplifier 68 exhibits an underdamped response to transients, becoming much more susceptible to noise. At phase margins significantly greater than 60 degrees, the voltage amplifier 68 exhibits an overdamped response, reacting sluggishly to transients. As an example, in response to the frame rate signal indicating a lower frame rate, the bias current may be set to one-half the former bias current value, and the compensation network 76 adjusted to have a lower open-loop gain crossover frequency with a phase margin of about 60 degrees. Reducing the bias current, decreases the power consumption of the voltage amplifier 68, while changing the compensation network to lower the crossover frequency reduces the noise susceptibility of the voltage amplifier 68.

Figure 5:
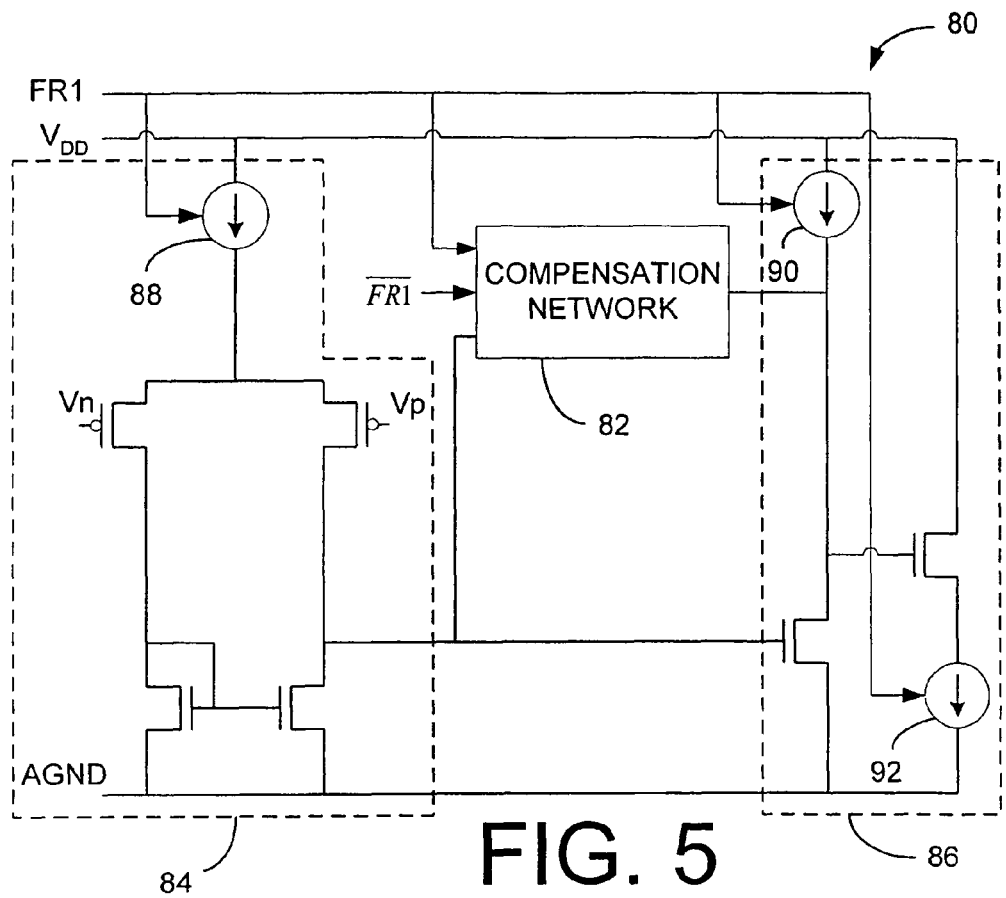
FIG. 5 is a schematic of a voltage amplifier.

FIG. 5 shows a schematic of an embodiment of a voltage amplifier 80. The voltage amplifier 80 includes a compensation network 82 coupled between a first stage 84 and a second stage 86. The first stage 84 and the second stage 86 include bias current generators 88-92 that are controllable by a frame rate signal FR1. The frame rate signal may also control the setting of the compensation network 82, reducing the amplifier bandwidth when operating the voltage amplifier 80 at slower frame rates.

For operation at 30 fps, a 10 uA bias current is generated by each of the bias current generators 88-92 to bias the first and second stages 84 and 86. The compensation network 82 is adjusted to provide an amplifier bandwidth of about 83 MHz.

For operation at 15 fps, a 5 uA bias current is generated by each of the bias current generators 88-92 in response to the frame rate signal to reduce power consumption. The compensation network 82 is adjusted to decrease the amplifier bandwidth to about 36 MHZ to reduce susceptibility to off-band noise and increase the settling time of the voltage amplifier 80.

Figure 6:
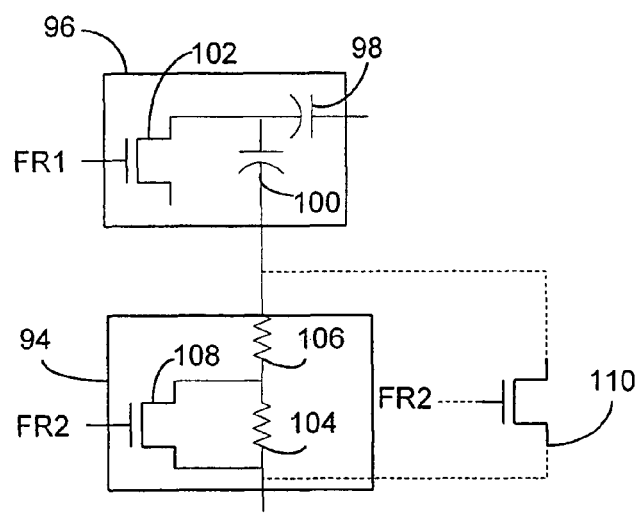
FIG. 6 shows an embodiment of a compensation network.

FIG. 6 shows an embodiment of the compensation network 82 which may include a controlled impedance 94 in combination with a controlled capacitance 96. The controlled capacitance 96 may be adjusted to control the bandwidth of the voltage amplifier 80 and the controlled impedance 94 may be adjusted to control the phase margin. The controlled capacitance 96 and controlled impedance 94 may be adjusted in discrete steps or over a continuous range of values.

The controlled capacitance 96 may include two or more capacitors 98-100 in combination with a switch 102. The switch 102 may be in series or parallel with selected ones of the capacitors 98-100 so that the capacitance of the controlled capacitance 96 is varied by changing the state of the switch 102 between open and closed.

The controlled impedance 94 may include two or more resistors 104-106 in combination with a switch 108. The switch 108 may be in series or parallel with selected ones of the resistors 104-106 so that the resistance of the controlled impedance 94 is varied by changing the state of the switch 108 between open and closed. The controlled impedance 94 may also be implemented with a transistor 110 such as a Field Effect Transistor (FET) that is operated in the active region so that the flow of current through the transistor is controlled.

Figure 7:
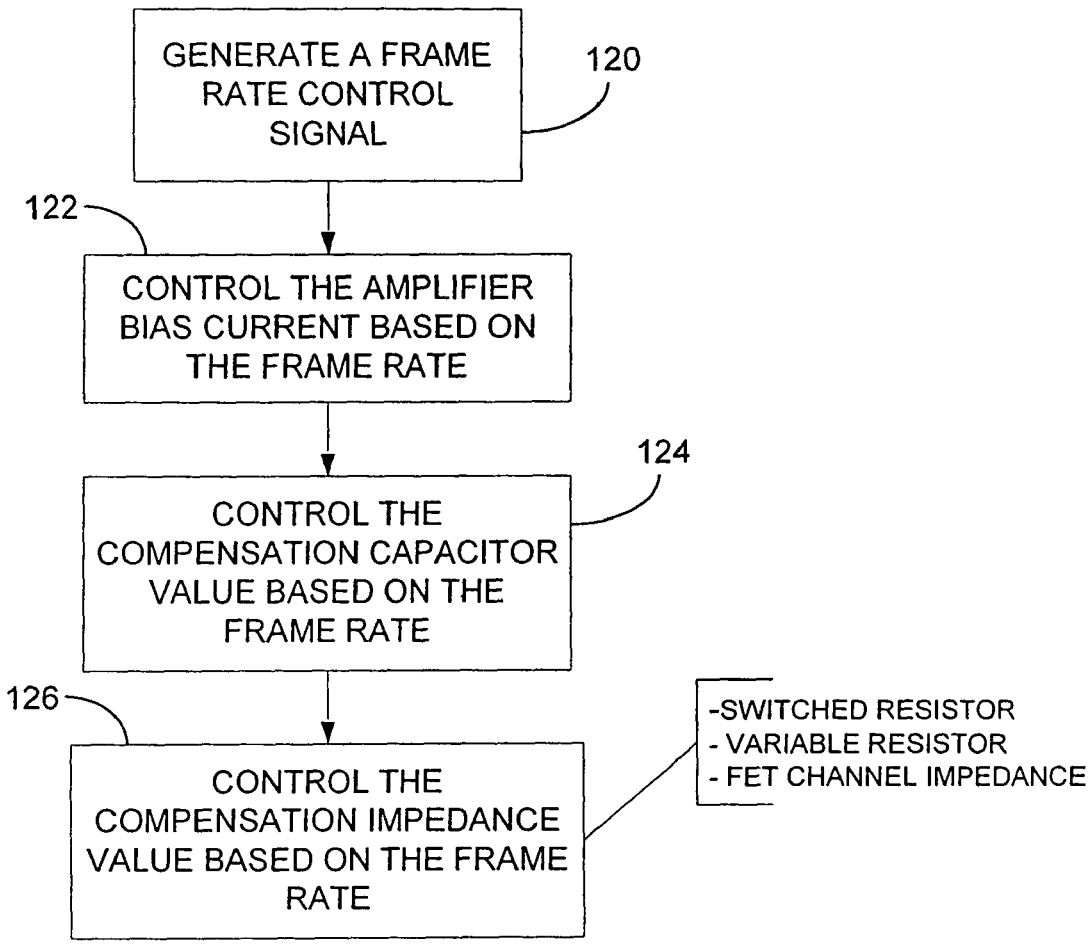
FIG. 7 is a flow diagram of a method of generating a controlled voltage.

FIG. 7 shows a method of generating a controlled output voltage. Beginning at state 120, a frame rate control signal is generated. The frame rate control signal is a function of the video frame rate of the imager system 30 (FIG. 1) that includes the voltage amplifier 68 (FIG. 4). Continuing on to state 122, the bias current of the voltage amplifier 68 is controlled as a function of the frame rate control signal so that at slower frame rates, a lower magnitude of bias current is generated in the voltage amplifier 68. At step 124, the capacitance of the compensation network 76 is controlled as a function of the frame rate control signal so that at slower frame rates the bandwidth of the voltage amplifier 68 is decreased. Concluding at step 126, the impedance of the compensation network 76 is controlled as a function of the frame rate control signal so that at slower frame rates the real portion of the current flowing in the compensation network is adjusted to provide about 60 degrees of phase margin.

A number of embodiments of the invention have been described. Nevertheless, it will be understood that various modifications may be made without departing from the spirit and scope of the invention. Accordingly, other embodiments are within the scope of the following claims.

What is claimed is:

1. A voltage amplifier, comprising:
   an amplifier stage to amplify an input signal; and
   a bias current generator to supply a bias current to the amplifier stage, the bias current generator controllable in response to a frame rate signal, the frame rate signal being representative of a video frame rate,
   wherein a loop response of the voltage amplifier is stabilized in response to the frame rate signal.

2. The voltage amplifier of claim 1, wherein the loop response of the voltage amplifier is stabilized with a Miller compensator.

3. The voltage amplifier of claim 2, wherein the Miller compensator includes a controlled capacitor having a value responsive to the frame rate signal.

4. The voltage amplifier of claim 3, wherein the Miller compensator further includes a controlled resistor having a value responsive to the frame rate signal.

5. The voltage amplifier of claim 4, wherein the controlled resistor includes a Field Effect Transistor operated in the active region.

6. The voltage amplifier of claim 4, wherein:
   the controlled resistor includes a first combination of a first switch and a compensation resistor; and
   the controlled capacitor includes a second combination of a second switch and a compensation capacitor.

7. The voltage amplifier of claim 1, wherein the amplifier stage includes a first stage and a second stage.

8. The voltage amplifier of claim 7, wherein the loop response of the voltage amplifier is stabilized between the first stage and the second stage.

9. A CMOS imager, comprising:
   an array of CMOS active pixel sensors;
   a row driver circuit to select a row of sensors in the array;
   a column readout circuit to readout a column of sensors in the array; a timing and control circuit to control the row driver circuit and the column readout circuit; and
   the voltage amplifier of claim 1,
   wherein said voltage amplifier is configured to generate a voltage signal in response to an input signal.

10. The CMOS imager of claim 9, wherein the loop response of the voltage amplifier is stabilized with a Miller compensator.

11. The CMOS imager of claim 10, wherein the Miller compensator includes a controlled capacitor having a value responsive to the frame rate signal.

12. The CMOS imager of claim 11, wherein the Miller compensator further includes a controlled resistor having a value responsive to the frame rate signal.

13. The CMOS imager of claim 12, wherein:
   the controlled resistor includes a first combination of a first switch and a compensation resistor; and
   the controlled capacitor includes a second combination of a second switch and a compensation capacitor.

14. A voltage amplifier having a controlled output comprising:
   a first stage to amplify an input signal;
   a second stage coupled to an output of the first stage to generate the controlled output;
   a first bias current generator to supply a first bias current to the first stage, the first bias current generator controllable in response to a frame rate signal; and
   a second bias current generator to supply a second bias current to the second stage, the second bias current generator controllable in response to the frame rate signal,
   wherein a loop response of the voltage amplifier is stabilized in response to the frame rate signal.

15. The voltage amplifier of claim 14, wherein the loop response of the voltage amplifier is stabilized with a controlled capacitor having a value responsive to the frame rate signal.

16. The voltage amplifier of claim 15, wherein the loop response of the voltage amplifier is further stabilized with a controlled resistor having a value responsive to the frame rate signal.

17. The voltage amplifier of claim 16, wherein the controlled resistor includes a Field Effect Transistor operated in the active region.

18. The voltage amplifier of claim 16, wherein:
   the controlled resistor includes a first combination of a first switch and a compensation resistor; and
   the controlled capacitor includes a second combination of a second switch and a compensation capacitor.

19. A method of generating a driver voltage for a CMOS imager, comprising:
   providing an amplifier;
   determining a video frame rate of the CMOS imager;
   in the amplifier, generating the driver voltage as a function of an input voltage; and
   controlling a bias current of the amplifier as a function of the video frame rate such that at a lower frame rate the bias current is reduced,
   wherein at a lower frame rate a bandwidth of the amplifier is reduced as a function of the video frame rate.

20. The method of claim 19, wherein as a function of the video frame rate a predetermined phase margin of the amplifier is maintained for a range of frame rates.

* * * * *